US011712929B2

(12) United States Patent
Shinzawa et al.

(10) Patent No.: US 11,712,929 B2
(45) Date of Patent: Aug. 1, 2023

(54) PNEUMATIC TIRE

(71) Applicant: The Yokohama Rubber Co., LTD., Tokyo (JP)

(72) Inventors: Tatsuro Shinzawa, Hiratsuka (JP); Kazuya Ishiguro, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 351 days.

(21) Appl. No.: 16/956,505

(22) PCT Filed: Dec. 14, 2018

(86) PCT No.: PCT/JP2018/046114
§ 371 (c)(1),
(2) Date: Jun. 19, 2020

(87) PCT Pub. No.: WO2019/124253
PCT Pub. Date: Jun. 27, 2019

(65) Prior Publication Data
US 2021/0094359 A1    Apr. 1, 2021

(30) Foreign Application Priority Data

Dec. 20, 2017 (JP) ................................. 2017-243390

(51) Int. Cl.
*B60C 13/02* (2006.01)
*B60C 13/00* (2006.01)
(Continued)

(52) U.S. Cl.
CPC ............ *B60C 13/02* (2013.01); *B60C 13/001* (2013.01); *B29D 30/72* (2013.01); *B29D 2030/728* (2013.01); *B60C 2015/061* (2013.01)

(58) Field of Classification Search
CPC ..................... B29D 2030/728; B60C 13/001
See application file for complete search history.

(56) References Cited

U.S. PATENT DOCUMENTS 4,343,342 A * 8/1982 McDonald ............ B60C 13/001
D12/605
2003/0084979 A1* 5/2003 Matsumoto ........... B60C 13/001
152/523

(Continued)

FOREIGN PATENT DOCUMENTS

DE    10 2010 061 740 A1    6/2011
DE    20 2014 011 007         6/2017

(Continued)

OTHER PUBLICATIONS

ESpaceNet Translation of WO2018192803 (Year: 2022).*
International Search Report for International Application No. PCT/JP2018/046114 dated Mar. 19, 2019, 4 pages, Japan.

*Primary Examiner* — Robert C Dye
*Assistant Examiner* — Alexander D Booth
(74) *Attorney, Agent, or Firm* — Thorpe North & Western

(57) ABSTRACT

A surface of each of the portions of a pneumatic tire includes a ridge pattern region provided with a plurality of ridges continuously extending in one direction and provided at intervals, a non-ridge pattern region including a smooth surface and not provided with the ridges, and a two-dimensional code including a dot pattern formed from two types of gray scale elements distinguishably formed using surface irregularities. The two-dimensional code is engraved entirely overlapping the ridge pattern region or engraved overlapping the ridge pattern region and the non-ridge pattern region.

17 Claims, 5 Drawing Sheets

(51) Int. Cl.
 *B29D 30/72* (2006.01)
 *B60C 15/06* (2006.01)

(56) References Cited

U.S. PATENT DOCUMENTS

| | | |
|---|---|---|
| 2006/0151451 A1 | 7/2006 | Smith, Jr. et al. |
| 2011/0139326 A1 | 6/2011 | Nukushina |
| 2013/0292024 A1 | 11/2013 | Kawai et al. |
| 2014/0216622 A1* | 8/2014 | Muhlhoff ............... B60C 13/02 |
| | | 152/523 |
| 2016/0239734 A1 | 8/2016 | Metz et al. |
| 2017/0011666 A1 | 1/2017 | Kraus |
| 2017/0050473 A1* | 2/2017 | Muhlhoff ............... B60C 13/02 |
| 2017/0213117 A1 | 7/2017 | Kraus |

FOREIGN PATENT DOCUMENTS

| | | |
|---|---|---|
| JP | H05-096914 | 4/1993 |
| JP | H08-072511 | 3/1996 |
| JP | 2005-164655 | 6/2005 |
| JP | 2005-300227 | 10/2005 |
| JP | 2012-076649 A | 4/2012 |
| JP | 2012-224194 | 11/2012 |
| JP | 2014-061820 | 4/2014 |
| WO | WO 2005/000714 | 1/2005 |
| WO | WO 2015/058874 | 4/2015 |
| WO | WO 2015/118155 | 8/2015 |
| WO | WO 2016/012412 | 1/2016 |
| WO | WO-2018192803 A1 * | 10/2018 ......... B23K 26/0006 |

* cited by examiner

PNEUMATIC TIRE

TECHNICAL FIELD

The present technology relates to a pneumatic tire and particularly relates to a pneumatic tire including a two-dimensional code engraved on a sidewall portion of the tire.

BACKGROUND ART

In recent years, a suggestion has been made about provision of a two-dimensional code on a sidewall portion of a tire as an identification code in which information is recorded. More information can be included in the two-dimensional code than in a one-dimensional code, and thus various pieces of information can be included in the two-dimensional code to manage the tire. In particular, a suggestion has been made about provision of a two-dimensional code in the sidewall portion of the tire by engraving a pattern of predetermined dot holes on the sidewall portion of the tire (see International Patent Publication No. WO 2005/000714).

The two-dimensional code formed by engraving the pattern of predetermined dot holes on the sidewall portion of the tire do not disappear unless side surface portions of the tire wear. Thus, the tire can be effectively managed.

In a pneumatic tire provided with a plurality of dot holes by engraving a two-dimensional code as described above, the two-dimensional code can be sufficiently read while the tire is new. However, in a case where the tire rolls under load in an outdoor environment, readability of the two-dimensional code may be reduced. "Reading of a two-dimensional code" refers to reading of a two-dimensional code by a two-dimensional code reader, for example, a mobile terminal, and "reduced readability" refers to an increased frequency of errors in reading. For the two-dimensional code provided in the pneumatic tire, the information recorded in the two-dimensional code is read and utilized while the pneumatic tire is in use. Thus, during long-term use of the tire, cracks occur and develop in the dot holes to cause irregularities on the surface of the two-dimensional code. Such irregularities make distinguishing between gray scale elements difficult, thereby reducing the readability of the two-dimensional code. This is not preferable. Thus, it is preferable that a reduction in readability of the two-dimensional code is suppressed during long-term use of the tire.

Additionally, the dot holes have a shape recessed substantially perpendicularly from the surface of the sidewall portion, and thus it is not preferable in terms of durability of side rubber and thus durability of the pneumatic tire that, during the use of the tire, cracks occur in the dot holes and develop in the depth direction of the side rubber and further along the surface of the sidewall portion.

SUMMARY

The present technology provides a pneumatic tire engraved with a two-dimensional code, the pneumatic tire being capable of suppressing a decrease in readability of the two-dimensional code even in a case where the pneumatic tire is used for an extended period of time.

An aspect of the present technology is a pneumatic tire including a pair of sidewall portions extending in a tire circumferential direction, the sidewall portions being provided to interpose an annular tread portion between the sidewall portions in a tire lateral direction, each of the sidewall portions including, on at least one surface of the sidewall portion, a ridge pattern region provided with a plurality of ridges continuously extending in one direction and provided at intervals, a non-ridge pattern region including a smooth surface and not provided with the ridges, and a two-dimensional code including a dot pattern formed from two types of gray scale elements distinguishably formed using surface irregularities.

The two-dimensional code is engraved with all of the region of the two-dimensional code overlapping the ridge pattern region or with the region of the two-dimensional code overlapping the ridge pattern region and the non-ridge pattern region.

Preferably, the two-dimensional code includes dot holes forming the dot pattern, and as compared to a valley floor of a valley between the ridges, a hole bottom of each of the dot holes is positioned on a recess side with respect to the surface of the sidewall portion.

Preferably, a hole depth d of the hole bottom is greater than a valley depth ds of the valley floor, and the hole depth d–valley depth ds is equal to or greater than 0.3 mm.

Preferably, a length p of one side of a unit cell region in the dot pattern of the two-dimensional code is less than an interval Ps between adjacent ridges in the ridge pattern region.

Preferably, the interval between the adjacent ridges in the ridge pattern region is constant in a portion in which the region of the two-dimensional code overlaps the ridge pattern region.

Preferably, the valley depth of the valley portion between the adjacent ridges in the ridge pattern region is constant in a portion in which the region of the two-dimensional code overlaps the ridge pattern region.

Preferably, an extending direction of the ridges is identical at any location in a portion in which the region of the two-dimensional code overlaps the ridge pattern region.

Preferably, the valley depth of the valley portion between the adjacent ridges in the ridge pattern region in the portion in which the region of the two-dimensional code overlaps the ridge pattern region is less than the valley depth of the valley portion between the adjacent ridges in a portion of the ridge pattern region, the portion surrounding and adjoining the region of the two-dimensional code.

Preferably, the two-dimensional code includes a rectangular dot pattern region provided with the two types of gray scale elements, a blank region is provided around the dot pattern region, the blank region including elements which are paler than dark elements among the gray scale elements and surround the dot pattern region, and a width of the blank region surrounding the dot pattern region is 10% to 25% of a largest dimension out of two dimensions, respectively in two orthogonal directions, of the rectangular shape of the dot pattern region, and at least a part of the blank region is disposed so as to overlap the ridge pattern region.

Also preferably, the two-dimensional code includes a rectangular dot pattern region provided with the two types of gray scale elements, a blank region is provided around the dot pattern region, the black region including elements which are paler than dark elements among the gray scale elements and surround the dot pattern region, and a width of the blank region surrounding the dot pattern region is 10% to 25% of a largest dimension out of two dimensions, respectively in two orthogonal directions, of the rectangular shape of the dot pattern region, and the blank region is a smooth surface not including the ridges.

Preferably, the two-dimensional code is provided on each of the sidewall portions on both sides in the tire lateral direction of the pneumatic tire.

According to the pneumatic tire described above, a decrease in readability of the two-dimensional codes can be suppressed even in a case where the pneumatic tire is used for an extended period of time.

DETAILED DESCRIPTION

Hereinafter, a pneumatic tire of the present embodiment will be described in detail.

Herein, "tire lateral direction" is the direction parallel with the rotation axis of the pneumatic tire. An outer side in the tire lateral direction is a side in the tire lateral direction away from a tire equator line CL (see FIG. 1) that represents the tire equatorial plane. An inner side in the tire lateral direction is a side in the tire lateral direction toward the tire equator line CL. A tire circumferential direction is a direction of rotation of the pneumatic tire about the center of the rotation axis. Tire radial direction is the direction orthogonal to the rotation axis of the pneumatic tire. An outer side in the tire lateral direction is a side away from the rotation axis. Similarly, an inner side in the tire radial direction is a side closer to the rotation axis.

Note that in the embodiments described below, two-dimensional codes are engraved on a sidewall portion. The engraving referred to in the present embodiment includes an aspect in which the energy of a laser beam is concentrated on the surface of the sidewall portion to locally heat and burn a side rubber member to form a plurality of fine dot holes in the surface, and the use of another means to provide recesses/protrusions on the side rubber member to form two-dimensional codes.

Figure 1:
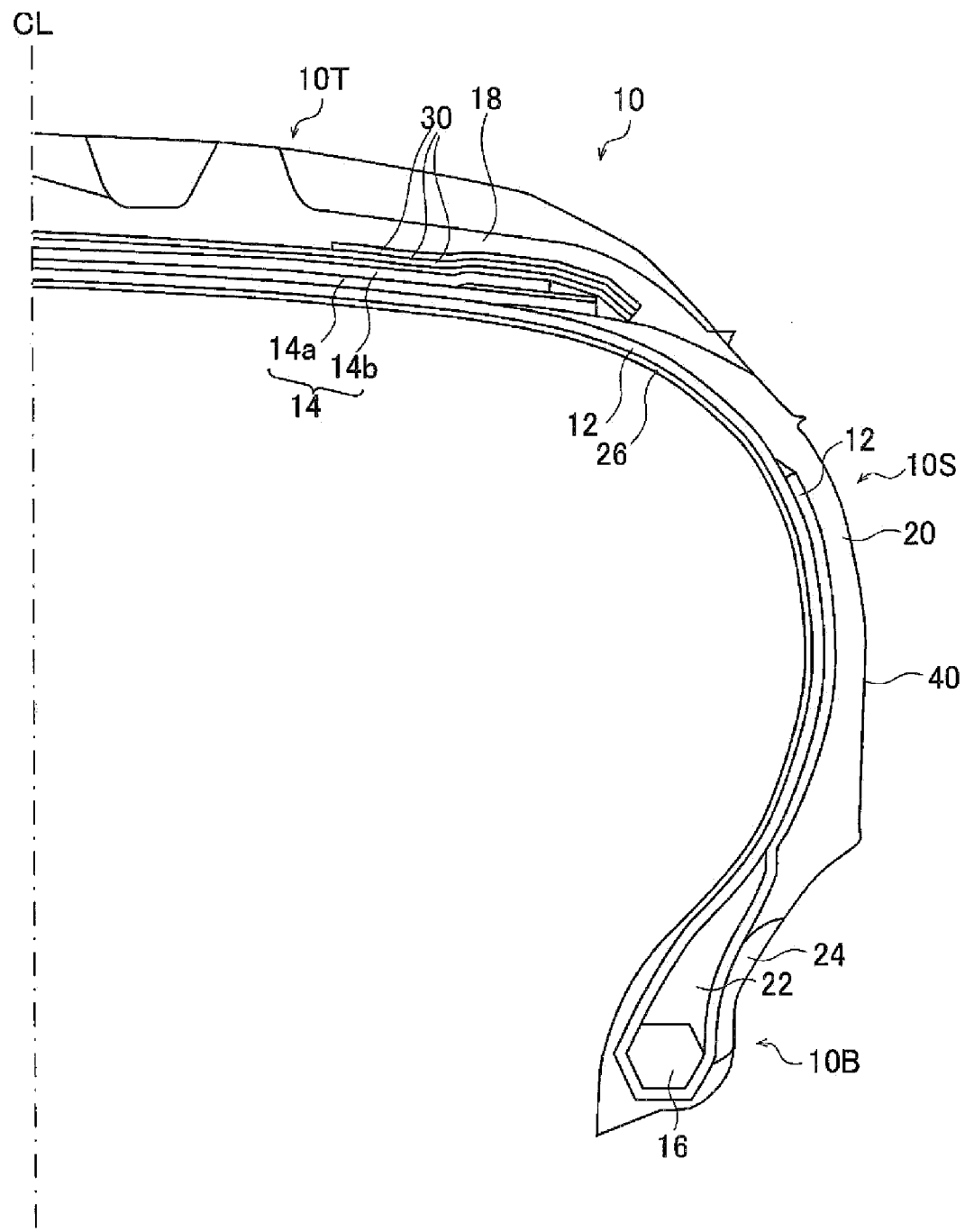
FIG. 1 is a diagram illustrating an example of a configuration of a pneumatic tire of an embodiment.

The two-dimensional codes referred to in the present embodiment are matrix display-based codes including information in two directions (compared to a one-dimensional bar code including information only in the lateral direction). Examples of the two-dimensional code include a QR code (trade name), a data matrix (trade name), Maxicode, PDF-417 (trade name), 16K code (trade name), 49 code (trade name), an Aztec code (trade name), an SP code (trade name), a Vericode (trade name), and a CP code (trade name).
Pneumatic Tire FIG. 1 is a diagram illustrating an example of a configuration of a pneumatic tire (hereinafter referred to as "tire") 10 of the present embodiment. FIG. 1 illustrates a profile cross section of one side in the tire lateral direction with respect to the tire equator CL.

The tire 10 includes a tread portion 10T including a tread pattern, a pair of bead portions 10B on the respective sides in the tire lateral direction, and a pair of side portions 10S provided on the respective sides of the tread portion 10T and connected to the pair of bead portions 10B and the tread portion 10T. The tread portion 10T comes into contact with a road surface. The sidewall portions 10S are provided to interpose the tread portion 10T between the sidewall portions 10S in the tire lateral direction. The bead portion 10B is a portion which is connected to the sidewall portion 10S and is located at the inner side of the sidewall portion 10S in the tire radial direction.

The tire 10 includes a carcass ply 12, a belt 14, and a bead core 16 as framework members, and mainly include a tread rubber member 18, side rubber members 20, bead filler rubber members 22, rim cushion rubber members 24, and an innerliner rubber member 26 around the framework members.

The carcass ply 12 includes a carcass ply member that is made of organic fibers covered with rubber and that is wound between a pair of annular bead cores 16 and formed into a toroidal shape. The carcass ply material is wound around the bead cores 16 and extends toward the outer side in the tire radial direction. The belt 14 is provided at the outer side of the carcass ply 12 in the tire radial direction and includes two belt members 14a and 14b. The belt 14 includes a member of rubber-covered steel cords arranged at a predetermined inclination angle of, for example, from 20 to 30 degrees with respect to the tire circumferential direction. A lower layer belt member 14a has a greater width in the tire lateral direction than an upper layer belt member 14b. The steel cords of the two belt members 14a and 14b are inclined in opposite directions. As such, the belt members 14a and 14b are crossing layers serving to suppress expansion of the carcass ply 12 due to the pressure of the air in the tire.

The tread rubber member 18 is provided at the outer side of the belt 14 in the tire radial direction. Both end portions of the tread rubber member 18 are respectively connected to the side rubber members 20 to form the sidewall portions. The rim cushion rubber members 24 are respectively provided at the inner ends of the side rubber members 20 in the tire radial direction and come into contact with a rim on which the tire 10 is mounted. The bead filler rubber member 22 is provided at the outer side of the bead cores 16 in the tire radial direction and is interposed between a portion of the carcass ply 12 that has not been wound around the bead core 16 and a portion of the carcass ply 12 that has been wound around the bead core 16. The innerliner rubber member 26 is provided on the inner surface of the tire 10 facing a tire cavity region that is filled with air and is surrounded by the tire 10 and the rim.

In addition, between the belt member 14b and the tread rubber member 18, a three-layer belt cover 30 is provided that is formed from organic fiber covered with rubber and covers the belt 14 from the outer side in the tire radial direction of the belt 14. The belt cover 30 may be provided as needed and is not mandatory. The number of layers of the belt cover 30 is not limited to three, and may be one or two.

Figure 2:
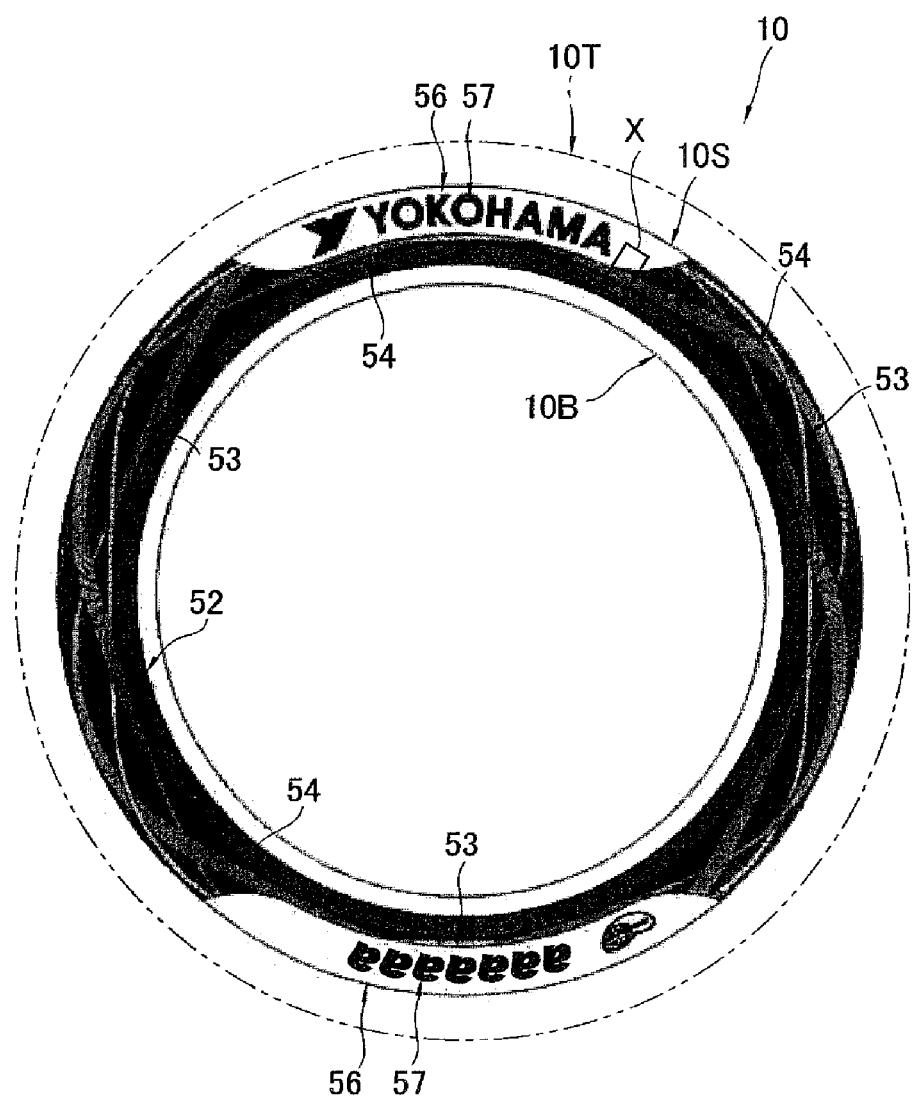
FIG. 2 is a diagram illustrating an example of a side pattern provided in a side wall portion of a tire of an embodiment.
Figure 3:
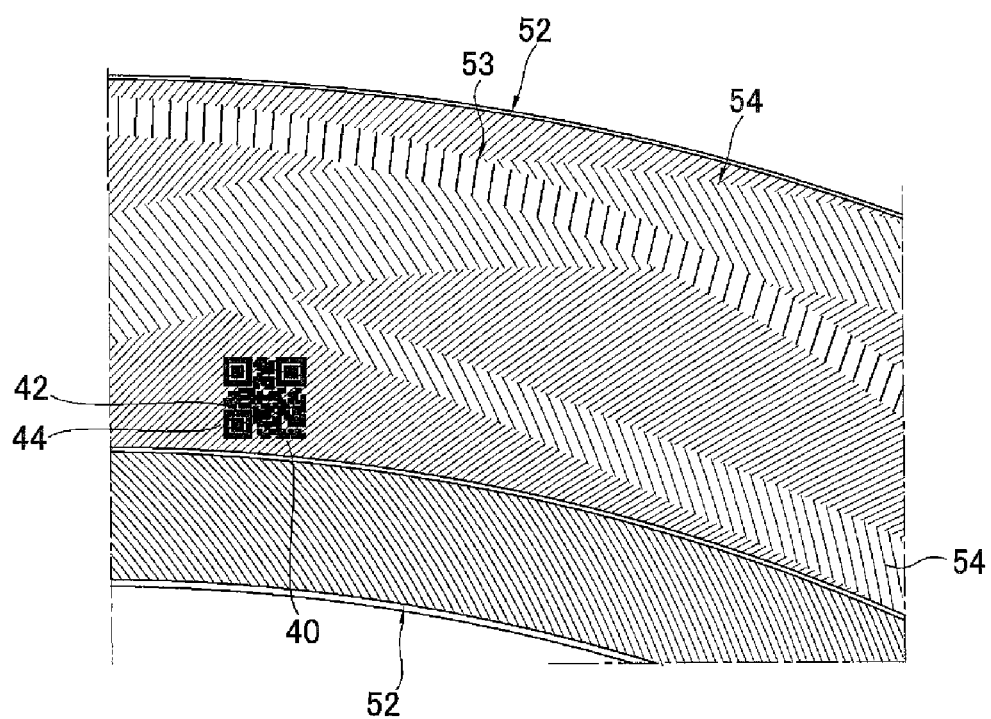
FIG. 3 is an enlarged diagram of a part of the side pattern illustrated in FIG. 2.

A two-dimensional code 40 is provided on the surface of the sidewall portion 10S of the tire 10 as described above.
Side Pattern FIG. 2 is a diagram illustrating an example of a side pattern provided on the sidewall portion 10S of the tire 10 according to an embodiment. FIG. 3 is an enlarged diagram of a part of the side pattern illustrated in FIG. 2.

As illustrated in FIG. 2, the side pattern is formed on the surface of the sidewall portion 10S. The side pattern mainly includes a ridge pattern region and a non-ridge pattern region. Note that, in FIG. 2, the two-dimensional code engraved on the surface of the sidewall portion 10S, which will be described below, is not illustrated.

The ridge pattern region includes a background ridge region 52, a first band-like ridge region 53, a second band-like ridge region 54, and a marking display region 57. The non-ridge pattern region includes a smooth surface region (non-ridge pattern region) 56.

The background ridge region 52 includes a plurality of ridges extending continuously in one direction and provided at predetermined intervals, and functions as a background that makes the first band-like ridge region 53 and the second band-like ridge region 54 stand out.

The first band-like ridge region 53 and the second band-like ridge region 54 are band-like regions in which a plurality of ridges extending continuously in one direction are provided at predetermined intervals, and these regions are displaced in the tire radial direction during movement in the tire circumferential direction. This presents a pattern in which the bands fluctuate on the sidewall portion 10S like waves.

The background ridge region 52, the first band-like ridge region 53, and the second band-like ridge region 54 include different types of ridges, which allow the regions 52, 53, and 54 to be visually distinguished from one another.

"Different types of ridges" refer to a difference in at least one of a valley depth from any one of adjacent ridges to a valley floor between the adjacent ridges, a distance between the adjacent ridges, and a direction in which the ridges extend.

As illustrated in FIG. 3, the second band-like ridge region 54 is configured to involve division into two regions or merger of two regions. In FIG. 3, the ridges are represented by lines, and in the example illustrated in FIG. 3, the distance between the adjacent ridges increases in the order of the background ridge region 52, the second band-like ridge region 54, and the first band-like ridge region 53, and the distance between the ridges in the first band-like ridge region 53 is the largest. The extending direction of the ridges also is different among the background ridge region 52, the first band-like ridge region 53, and the second band-like ridge region 54.

The markings display region 57 is surrounded by the smooth surface region 56, and represents markings as illustrated in FIG. 2. The inside of the markings display region 57 is provided with ridges extending in one direction and allowing the markings display region 57 to be distinguished from the smooth surface region 56.

The smooth surface region 56 includes no ridges and forms a smooth surface.

The two-dimensional code 40 is provided on such a side pattern.

Two-Dimensional Code

As illustrated in FIG. 3, the two-dimensional code 40 is engraved on the background ridge region 52. The two-dimensional code 40 as described above is formed on the surface of the side rubber member 20 in both the sidewall portions 10S on both sides in the tire lateral direction. According to another embodiment, the two-dimensional code is formed on the surface of the side rubber member 20 in one of the sidewall portions 10S.

The two-dimensional code 40 comprises a dot pattern including two types of gray scale elements. Irregularity formed on the surface due to the two types of gray scale elements makes the two types of gray scale elements distinguishable from each other. The two-dimensional code 40 of the present embodiment is a pattern formed by condensing the laser beam on the surface of the sidewall portion 10S to concentrate the energy in order to locally heat and burn the side rubber member 20, engraving a plurality of fine dot holes 40a (see FIG. 5B) on the surface. The dot hole 40a is, for example, a conical hole, and has a diameter of, for example, 0.1 to 1.0 mm and a depth of, for example, 0.3 to 1.0 mm on the surface of side portions 10S.

The two-dimensional code 40 is configured by forming one dot hole 40a (recess portion) in each of unit cell regions of dark elements among unit regions for classifying the gray scale elements of two-dimensional code. Specifically, the two-dimensional code 40 has a configuration in which dot holes 40a are arranged corresponding to a plurality of rectangular unit cell regions of the same size resulting from division of the code into lattices such that one dot hole 40a forms one unit cell region with a dark gray scale element. In FIG. 3, the dark regions of the unit cell regions are illustrated as regions filled in black.

The two-dimensional code 40 illustrated in FIG. 3 is a QR code (trade name) and includes a dot pattern region 42 in which a dot pattern is formed of two types of gray scale elements. A blank region 44 is provided around the dot pattern region such that elements paler than dark elements of the gray scale elements, preferably elements as pale as pale elements of the gray scale elements, surround the dot pattern region. The blank region 44 is known as a quiet zone in a QR code (trade name) and required to read the QR code (trade name). Preferably, the width of the blank region 44 surrounding the dot pattern region 42 is, for example, four to five times as long as the size of each of the unit cell regions in the dot pattern region 42. For example, preferably, the width w of the blank region 44 is 10% to 25% of the largest dimension out of the two dimensions, respectively in two orthogonal directions, of the rectangular shape of the dot pattern region 42.

Since the two-dimensional code 40 illustrated in FIG. 3 is a QR code (trade name), the dot pattern region 42 includes a data cell region displaying data cells in the QR code (trade name), and position detection pattern regions displaying position detection patterns.

In this way, the two-dimensional code 40 is engraved on the background ridge region 52, and thus the dot hole 40a is formed in each ridge or a valley portion between ridges. Thus, ridges or valley portions are also formed in pale element portions in which no dot holes 40a are formed.

Figure 4:
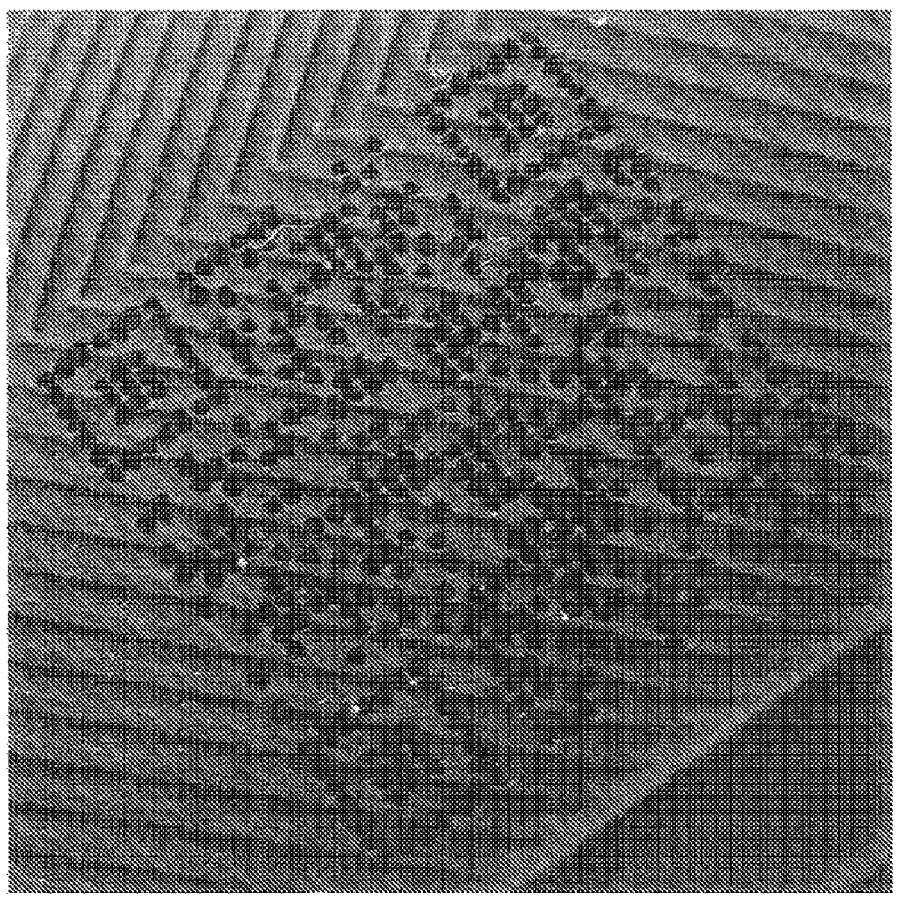
FIG. 4 is a photograph of an example of a QR code (trade name) engraved on a ridge pattern region in an embodiment.

FIG. 4 is a photograph of an example of a QR code (trade name) engraved on a ridge pattern region of an aspect different from the aspect in FIG. 3. As illustrated in FIG. 4, even in a case where a QR code (trade name) is engraved on the ridge pattern region, the QR code (trade name) is visible and can be read by a two-dimensional code reader.

The ridges in such a ridge pattern region are shaped by recesses/protrusions formed on a side forming surface of a tire mold. Thus, a multiplicity of striped microgrooves corresponding to the ridges extend in the side forming surface of the tire mold. Accordingly, during tire vulcanization, in a case where a green tire is inflated and pressed against the side forming surface of the tire mold, the multiplicity of striped microgrooves in the side forming surface function as passages for allowing the gas between the tire mold and the green tire to escape, thus preventing vulcanization defects. "Vulcanization defects" refer to portions in which, during tire vulcanization, a gas trapped in a gap between the tire mold and the green tire due to insufficient discharge of the gas from between the tire mold and the green tire hinders contact between the green tire and the side forming surface controlled to high temperature, preventing sufficient vulcanization of the green tire. Such vulcanization defects affect tire performance, and are thus preferably less likely to occur. In particular, in recent years, the thickness of the side rubber member 20 has been reduced to decrease the rolling resistance and weight of the tire. However, in a case where such tires are produced using a tire mold, the gap between the side forming surface and the green tire is wider than in the related art, leading to an increased amount of gas to be discharged from inside the tire mold. Thus, the gas is partially precluded from being sufficiently discharged due to minor irregularity of shape of the green tire, uneven expansion of the green tire inside the tire mold, or the like, leading to a high likelihood of vulcanization defects.

Engraving of the two-dimensional code 40 is often performed on a vulcanized tire that has not been visually checked yet. In this case, engraving the two-dimensional code 40 on a portion subjected to a vulcanization defect aggravates the vulcanization defect, that is, the failure, due to the heat of the engraving, further varies, in size, the dot holes 40a (see FIG. 5B) engraved on the vulcanization defect portion, and further makes cracks likely to occur during long-term use of the tire. Even a portion subjected to a minor vulcanization defect that can be corrected or a very minor vulcanization defect that fails to be detected varies, in size, the dot holes 40a in the vulcanization defect portion and makes cracks likely to occur and develop during long-term use of the tire. Occurrence and development of cracks vary the surface irregularities of the two-dimensional code 40, reducing distinguishability of the gray scale elements and lowering readability. Specifically, engraving the two-dimensional code 40 on the portion of a vulcanization defect is not preferable for the durability of the sidewall portion 10S and readability varying during long-term use of the tire, regardless of whether the vulcanization defect is minor or very minor. Thus, desirably, the position where the two-dimensional code 40 is engraved is located in a region with no vulcanization defects. Accordingly, the two-dimensional codes 40 is effectively engraved on the ridge pattern region such as the background ridge region 52 where no vulcanization defects occur. Engraving the two-dimensional code 40 in the ridge pattern region prevents the two-dimensional code 40 from being engraved on the portion of a vulcanization defect (including minor and very minor vulcanization defects), thus allowing suppression of irregularity of size of the dot hole 40a caused by engraving on the portion of a vulcanization defect. Furthermore, avoidance of engraving on the portion of a minor or a very minor vulcanization defect allows suppression of occurrence and development of cracks associated with the use of the tire, and suppression of decrease in the durability of the sidewall portion 10S and in readability associated with the use of the tire.

In a case where the tire with the two-dimensional code 40 is engraved on the ridge pattern region is used for a long period of time, there is likely to be difficulty in distinguishing the gray scale elements of the two-dimensional code 40 from the gray scale elements of the ridge pattern, possibly leading to reduced readability of the two-dimensional code 40. However, in a case where the tire is used for a long period of time, a decrease in readability of the two-dimensional code 40 caused by engraving on the ridge pattern region is smaller than a decrease in readability caused by cracks occurring and developing due to engraving of the two-dimensional code 40 on the portion of a vulcanization defect (including minor and very minor vulcanization defects). In other words, by engraving the two-dimensional codes 40 on the ridge pattern regions, there is little reduction in the readability of the two-dimensional codes 40 when the tire is used for a long period of time compared with cases in which the two-dimensional codes 40 are engraved on the non-ridge pattern region. In this manner, engraving of the two-dimensional code 40 on the ridge pattern region where no vulcanization defects occur is preferable in terms of readability in a case where the two-dimensional code 40 is read after long-term use of the tire.

In the case illustrated in the present embodiment, the two-dimensional code 40 is engraved on the ridge pattern region. However, even in the non-ridge pattern region around the ridge pattern region, that is, in the smooth surface region, very few vulcanization defects (including minor and very minor vulcanization defects) occur in a region near a boundary with the ridge pattern region. Thus, the two-dimensional code 40 may be engraved on a region located in the smooth surface region near the boundary with the ridge pattern region. For example, the two-dimensional code 40 may be engraved on a region X illustrated in FIG. 2. Specifically, all of the two-dimensional code 40 may be engraved overlapping the ridge pattern region, or the two-dimensional code 40 may be engraved overlapping both the ridge pattern region and the smooth surface region (non-ridge pattern region). In other words, it is sufficient that at least a part of the two-dimensional code 40 is engraved overlapping the ridge pattern region. The two-dimensional code 40 engraved on a region near the boundary between the ridge pattern region and the smooth surface as described above allows suppression of a decrease in durability of the sidewall portion 10S and a decrease in readability associated with long-term use of the tire.

In the two-dimensional code 40 as described above, the hole bottoms of the dot holes 40a forming the dot pattern is preferably positioned recessed from the surface of the sidewall portion 10S as compared to the valley floor of the valley portion between the ridges. Thus, in a case where the surface of the sidewall portion 10S is viewed, the dot holes 40a can be viewed as dark regions as illustrated in FIG. 4, allowing the dot pattern to be easily distinguished from the ridge pattern region.

Figure 5A:
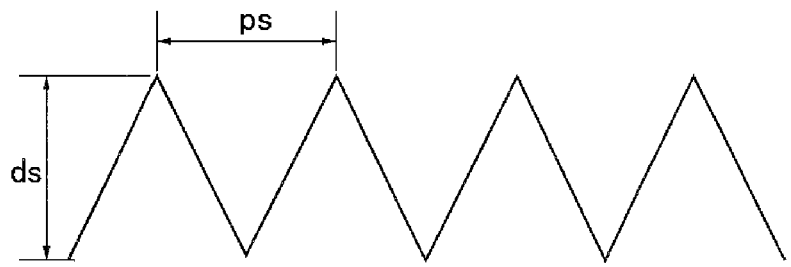
FIGS. 5A and 5B are diagrams schematically illustrating surface irregularities of a ridge pattern region and surface irregularities of two-dimensional codes.
Figure 5B:
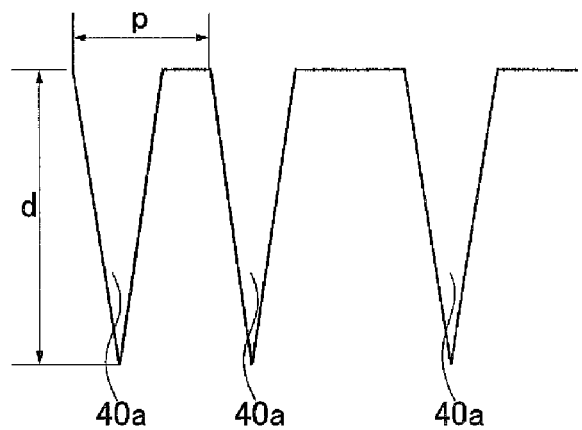

FIGS. 5A and 5B are diagrams schematically illustrating the surface irregularities of the ridge pattern region and the surface irregularities of the two-dimensional code 40. In view of easy distinction of the dot pattern from the ridge pattern region, preferably there is a difference of 0.3 mm or more between the hole depth d of the hole bottom of the dot hole 40a (see FIG. 5B) and the valley depth ds of the valley floor between the adjacent ridges (see FIG. 5A). In other words, the depth of the hole bottom of the dot hole 40a is preferably greater than the depth of the valley floor of the valley portion between the ridges. Making the difference excessively large excessively increases the hole depth d of the dot hole 40a. This is not preferable in terms of the durability of the sidewall portion 10S. Thus, the difference is preferably 1 mm or less. Note that, as illustrated in FIG. 4, some of the dot holes 40 are formed overlapping the ridges in the ridge pattern region. Additionally, the dot holes are formed in the valley portions. The hole depth d is a depth from a top portion of the ridge to the hole bottom in a case where the dot holes are formed overlapping the ridges in the ridge pattern region, or is a depth from the valley portion to the hole bottom in a case where the dot hole is formed in the valley portion.

In addition, according to an embodiment, a length p of one side of the unit cell region in the dot pattern of the two-dimensional code 40 (see FIG. 5B) is preferably shorter than an interval ps between the adjacent ridges in the ridge pattern region (see FIG. 5A). With the length p equal to or greater than the interval ps, a plurality of ridges are present in the unit cell region in the dot pattern, and difference in gray scale between the unit cell region with the dot hole 40*a* and the unit cell region without the dot hole 40*a* is reduced, leading to reduced readability.

In addition, according to an embodiment, the interval ps between the adjacent ridges is preferably constant in a portion in which the region of the two-dimensional code 40 overlaps the ridge pattern region. In the portion in which the region of the two-dimensional code 40 overlaps the ridge pattern region, a change in interval ps between the ridges makes a difference in gray scale between a portion with the interval ps between the ridges changed and the dark or pale element in the dot pattern differ from a difference in gray scale between a portion with the interval ps between the ridges unchanged and the dark or pale element in the dot pattern. This is likely to reduce readability. In this regard, the interval ps between the adjacent ridges is preferably constant in the portion in which the region of the two-dimensional code 40 overlaps the ridge pattern region.

According to an embodiment, the valley depth ds of the valley portion between the adjacent ridges is preferably constant in the portion in which the region of the two-dimensional code 40 overlaps the ridge pattern region. In the portion in which the region of the two-dimensional code 40 overlaps the ridge pattern region, a change in valley depth ds makes a difference in gray scale between a portion with the valley depth ds changed and the dark or pale element in the dot pattern differ from a difference in gray scale between a portion with the valley depth ds unchanged and the dark or pale element in the dot pattern. This is likely to reduce readability. In this regard, the valley depth ds between the adjacent ridges is preferably constant in the portion in which the region of the two-dimensional code 40 overlaps the ridge pattern region.

Preferably, the extending direction of the ridges is constant at any locations in the portion in which the region of the two-dimensional code 40 overlaps the ridge pattern region. The ridges appear dark or pale depending on the irradiation direction of light, and thus a change in extending direction of the ridges is not preferable because the change reduces the readability of the two-dimensional code 40.

In addition, according to an embodiment, the valley depth ds of the valley portion between the adjacent ridges in the portion in which the region of the two-dimensional code 40 overlaps the ridge pattern region is preferably less than the valley depth ds of the valley portion between the adjacent ridges in a portion of the ridge pattern region adjoining and surrounding the region of the two-dimensional code 40. In a case where the valley depth ds in the portion in which the region of the two-dimensional code 40 overlaps the ridge pattern region is almost the same as the valley depth ds in the ridge pattern region adjoining the two-dimensional code, the ridge pattern region is likely to be dark. This leads to difficulty in distinguishing the ridge pattern region from the dark elements of the gray scale elements of the two-dimensional codes 40 to reduce the readability of the two-dimensional code 40.

According to an embodiment, as described above, at least a portion of the blank region 44 is preferably disposed so as to overlap the ridge pattern region along with the dot pattern region 42. In a case where the blank region 44 is read for the dot pattern, the blank region 44 needs to be read as a pale element of the gray scale elements. The blank region 44 is identified preferably as an element paler than the dark elements of the gray scale elements in the dot pattern region 42, and more preferably as an element as pale as the pale elements of the gray scale elements. In this regard, at least a part of the blank region 44 is preferably disposed overlapping the ridge pattern region with no vulcanization defects.

Additionally, according to an embodiment, the blank region 44 may be a smooth surface with no ridges. The smooth surface functions reliably as a pale element of the gray scale elements as compared to the ridge pattern region. This is preferable in terms of readability.

Examples, Conventional Example

To confirm the effect of the tire 10, the two-dimensional code 40, specifically a QR code (trade name) was engraved on the sidewall portion 10S as illustrated in FIG. 2, and was read after traveling with the tire 10.

The tire 10 (tire size of 195/65R15 91H) provided with the two-dimensional code 40 was mounted on a 15×6 J rim. After the tire 10 was irradiated with ozone at an ozone concentration of 100 pphm, indoor drum running (at a speed of 120 km/hour) based on an FMVSS139-compliant low pressure test (XL: an air pressure of 160 kPa and a load of 100% LI) was conducted for 1.5 hours, with ozone irradiation at the above-described concentration performed at predetermined time intervals. This test is a simulation of tire deterioration due to long-term use of the tire.

For each of Examples and Conventional Example, 10 tires each provided with the two-dimensional code 40 were prepared, and the test was performed.

The two-dimensional code 40 was read using a two-dimensional code reader, and the two-dimensional code was irradiated with illumination light from a predetermined direction. Rating is A in a case where reading is successful with the 10 tires. Rating is B in a case where reading is successful with the 10 tires, with the manner of irradiation of illumination light changed for one or two of the tires for the success. Rating is C in a case where reading is successful with the 10 tires, with the manner of irradiation of illumination light changed for three or four of the tires for the success. Rating is D in a case where reading is successful with the 10 tires, with the manner of irradiation of illumination light changed for five or six of the tires for the success. Rating is E in a case where reading is successful with the 10 tires, with the manner of irradiation of illumination light changed for seven to ten of the tires for the success. Rating is F in a case where reading is unsuccessful with at least one of the tires. Ratings A to E correspond to passes, and rating F corresponds to a fail.

Tables 1 and 2 indicate specifications and evaluation results.

The engraved QR code (trade name) corresponding to the two-dimensional code 40 has a hole depth d=1.5 mm and a length p=0.6 mm, as indicated in Tables 1 and 2. The two-dimensional code 40 is engraved on the background ridge region 52 or in the vicinity of a region X as illustrated in FIG. 2, and the ratio of the overlapping portion to the region of the two-dimensional codes 40 is varied (10%, 15%, 80%, and 100%).

In Examples 1 to 9, the valley depth ds is 1.0 mm, 1.2 mm, or 1.3 mm, and the interval ps is 0.8 mm or 0.6 mm. In Example 9, the two-dimensional codes 40 is engraved at a location where the orientation of the ridges changes.

TABLE 1

|  | Conventional Example | Example 1 | Example 2 | Example 3 |
|---|---|---|---|---|
| Whether two-dimensional code is located in ridge pattern region | No | Yes | Yes | Yes |
| Region of overlapping portion/ region of two-dimensional code | 0% | 15% | 80% | 100% |
| Hole depth d (mm) – valley depth ds (mm) | 0.5 mm (=1.5 mm – 1.0 mm) | 0.5 mm (=1.5 mm – 1.0 mm) | 0.5 mm (=1.5 mm – 1.0 mm) | 0.5 mm (=1.5 mm – 1.0 mm) |
| ps-p | 0.2 mm | 0.2 mm | 0.2 mm | 0.2 mm |
| Distance ps of overlapping portion is constant or is varied | — | Constant (ps = 0.8 mm) | Constant (ps = 0.8 mm) | Constant (ps = 0.8 mm) |
| Valley depth ds of overlapping portion is constant or is varied | — | Constant (ds = 1.0 mm) | Constant (ds = 1.0 mm) | Constant (ds = 1.0 mm) |
| Orientation of ridges in overlapping portion is constant or is varied | — | Constant (45 degrees) | Constant (45 degrees) | Constant (45 degrees) |
| Readability Evaluation | F | B | A | A |

TABLE 2

|  | Example 4 | Example 5 | Example 6 | Example 7 | Example 8 | Example 9 |
|---|---|---|---|---|---|---|
| Whether two-dimensional code is located in ridge pattern region | Yes | Yes | Yes | Yes | Yes | Yes |
| Region of overlapping portion/ region of two-dimensional code | 100% | 100% | 100% | 100% | 100% | 100% |
| Hole depth d (mm) – valley depth ds [mm] | 0.2 mm (=1.5 mm – 1.3 mm) | 0.3 mm (=1.5 mm – 1.2 mm) | 0.5 mm (=1.5 mm – 1.0 mm) | 0.5 mm (=1.5 mm – 1.0 mm) | 0.5 mm (=1.5 mm – 1.0 mm), 0.2 mm | 0.5 mm (=1.5 mm – 1.0 mm) |
| ps-p | 0.2 mm | 0.2 mm | 0 mm | 0.2 mm, 0 mm | 0.2 mm | 0.2 mm |
| Distance ps of overlapping portion is constant or is varied | Constant (ps = 0.8 mm) | Constant (ps = 0.8 mm) | Constant (ps = 0.8 mm) | Varied (ps = 0.8 mm or 0.6 mm) | Constant (ps = 0.8 mm) | Constant (ps = 0.8 mm) |
| Valley depth ds of overlapping portion is constant or is varied | Constant (ds = 1.3 mm) | Constant (ds = 1.2 mm) | Constant (ds = 1.0 mm) | Constant (ds = 1.0 mm) | Varied (ds = 1.3 mm or 1.0 mm) | Constant (ds = 1.0 mm) |
| Orientation of ridges in overlapping portion is constant or varies | Constant (45 degrees) | Constant (45 degrees) | Constant (45 degrees) | Constant (45 degrees) | Constant (45 degrees) | Varied (45 degrees or 105 degrees) |
| Readability Evaluation | C | B | C | C | C | D |

Conventional Example and Examples 1 to 3 in Table 1 indicate that, engraving at least a part of the two-dimensional code 40 on the ridge pattern region makes readability excellent. As described above, for the readability of the two-dimensional codes 40, engraving the two-dimensional code 40 on the region of the smooth surface is more preferable than engraving the two-dimensional code 40 on the ridge pattern region, in terms of the readability in the initial use period. However, in a case where the two-dimensional code 40 is engraved on the portion of the smooth surface spaced from the ridge pattern region, the portion involving a high likelihood of vulcanization defects (including minor or very minor vulcanization defects), the readability decreases more significantly due to occurrence and development of cracks after long-term use of the tire than in a case where the two-dimensional code is engraved on or in the vicinity of the ridge pattern region. As described above, excellent readability is achieved in a case where at least a part of the two-dimensional code is engraved on the ridge pattern region.

Additionally, a comparison of Examples 3 to 5 in Tables 1 and 2 indicates that it is preferable in view of improved reliability that the hole depth d is greater than the valley depth ds and that the hole depth d (mm)–valley depth ds (mm) is 0.3 mm or greater.

A comparison of Examples 3 and 6 in Tables 1 and 2 indicates that it is preferable in terms of readability that the length p of one side of the unit cell region in the dot pattern of the two-dimensional code 40 is less than the interval ps in the ridge pattern region.

A comparison of Example 3 and Examples 7 to 9 in Tables 1 and 2 indicates that, although the ridge pattern in the ridge pattern region overlapping the region of the two-dimensional code 40 may have a varying valley depth ds, a varying interval ps, and a varying extending direction of the ridges, it is preferable in terms of readability that the valley depth ds, the interval ps, and the extending direction of the ridges are not varied.

While the pneumatic tire according to the embodiments of the present technology is described above in detail, the present technology is not limited to the above embodiments and may be improved or modified in various ways within a range without departing from the essence of the present technology as a matter of course.

The invention claimed is:

1. A pneumatic tire comprising:
a pair of sidewall portions extending in a tire circumferential direction, the sidewall portions being provided to interpose an annular tread portion between the sidewall portions in a tire lateral direction,
each of the sidewall portions including, on at least one surface of the sidewall portion, a ridge pattern region provided with a plurality of ridges continuously extending in one direction and provided at intervals, a non-ridge pattern region including a smooth surface and not provided with the ridges, and a two-dimensional code including a dot pattern formed from two types of gray scale elements distinguishably formed using surface irregularities, and
the two-dimensional code being engraved with all of a region of the two-dimensional code overlapping the ridge pattern region or with the region of the two-dimensional code overlapping the ridge pattern region and the non-ridge pattern region, wherein
the two-dimensional code includes dot holes forming the dot pattern, and some of the dot holes are formed overlapping the ridges; wherein
as compared to a valley floor of a valley portion between the ridges, a hole bottom of each of the dot holes is positioned on a recess side with respect to the surface of the sidewall portion, and
a hole depth d of the hole bottom is greater than a valley depth ds of the valley floor, and the hole depth d—valley depth ds is equal to or greater than 0.4 mm.

2. The pneumatic tire according to claim 1, wherein a length p of one side of a unit cell region in the dot pattern of the two-dimensional code is less than an interval Ps between adjacent ridges in the ridge pattern region.

3. The pneumatic tire according to claim 1, wherein the interval between the adjacent ridges in the ridge pattern region is constant in a portion in which the region of the two-dimensional code overlaps the ridge pattern region.

4. The pneumatic tire according to claim 1, wherein a valley depth of a valley portion between the adjacent ridges in the ridge pattern region is constant in a portion in which the region of the two-dimensional code overlaps the ridge pattern region.

5. The pneumatic tire according to claim 1, wherein an extending direction of the ridges is identical at any location in a portion in which the region of the two-dimensional code overlaps the ridge pattern region.

6. The pneumatic tire according to claim 1, wherein a valley depth of a valley portion between the adjacent ridges in the ridge pattern region in the portion in which the region of the two-dimensional code overlaps the ridge pattern region is less than the valley depth of the valley portion between the adjacent ridges in a portion of the ridge pattern region, the portion surrounding and adjoining the region of the two-dimensional code.

7. The pneumatic tire according to claim 1, wherein the two-dimensional code includes a rectangular dot pattern region provided with the two types of gray scale elements, a blank region is provided around the dot pattern region, the blank region including elements which are paler than dark elements among the gray scale elements and surround the dot pattern region, and a width of the blank region surrounding the dot pattern region is 10% to 25% of a largest dimension out of two dimensions, respectively in two orthogonal directions, of the rectangular shape of the dot pattern region, and at least a part of the blank region is disposed so as to overlap the ridge pattern region.

8. The pneumatic tire according to claim 1, wherein the two-dimensional code includes a rectangular dot pattern region provided with the two types of gray scale elements, a blank region is provided around the dot pattern region, the blank region including elements which are paler than dark elements among the gray scale elements and surround the dot pattern region, and a width of the blank region surrounding the dot pattern region is 10% to 25% of a largest dimension out of two dimensions, respectively in two orthogonal directions, of the rectangular shape of the dot pattern region, and the blank region is a smooth surface not including the ridges.

9. The pneumatic tire according to claim 1, wherein the two-dimensional code is provided on each of the sidewall portions on both sides in the tire lateral direction of the pneumatic tire.

10. The pneumatic tire according to claim 2, wherein the interval between the adjacent ridges in the ridge pattern region is constant in a portion in which the region of the two-dimensional code overlaps the ridge pattern region.

11. The pneumatic tire according to claim 10, wherein the valley depth of the valley portion between the adjacent ridges in the ridge pattern region is constant in a portion in which the region of the two-dimensional code overlaps the ridge pattern region.

12. The pneumatic tire according to claim 11, wherein an extending direction of the ridges is identical at any location in a portion in which the region of the two-dimensional code overlaps the ridge pattern region.

13. The pneumatic tire according to claim 12, wherein the valley depth of the valley portion between the adjacent ridges in the ridge pattern region in the portion in which the region of the two-dimensional code overlaps the ridge pattern region is less than the valley depth of the valley portion between the adjacent ridges in a portion of the ridge pattern region, the portion surrounding and adjoining the region of the two-dimensional code.

14. The pneumatic tire according to claim 13, wherein the two-dimensional code includes a rectangular dot pattern region provided with the two types of gray scale elements, a blank region is provided around the dot pattern region, the blank region including elements which are paler than dark elements among the gray scale elements and surround the dot pattern region, and a width of the blank region surrounding the dot pattern region is 10% to 25% of a largest dimension out of two dimensions, respectively in two orthogonal directions, of the rectangular shape of the dot pattern region, and at least a part of the blank region is disposed so as to overlap the ridge pattern region.

15. The pneumatic tire according to claim 13, wherein
the two-dimensional code includes a rectangular dot pattern region provided with the two types of gray scale elements, a blank region is provided around the dot pattern region, the blank region including elements which are paler than dark elements among the gray scale elements and surround the dot pattern region, and a width of the blank region surrounding the dot pattern region is 10% to 25% of a largest dimension out of two dimensions, respectively in two orthogonal directions, of the rectangular shape of the dot pattern region, and
the blank region is a smooth surface not including the ridges.

16. The pneumatic tire according to claim 15, wherein
the two-dimensional code is provided on each of the sidewall portions on both sides in the tire lateral direction of the pneumatic tire.

17. A pneumatic tire comprising:
a pair of sidewall portions extending in a tire circumferential direction, the sidewall portions being provided to interpose an annular tread portion between the sidewall portions in a tire lateral direction,
each of the sidewall portions including, on at least one surface of the sidewall portion, a ridge pattern region provided with a plurality of ridges continuously extending in one direction and provided at intervals, a non-ridge pattern region including a smooth surface and not provided with the ridges, and a two-dimensional code including a dot pattern formed from two types of gray scale elements distinguishably formed using surface irregularities, and
the two-dimensional code being engraved with all of a region of the two-dimensional code overlapping the ridge pattern region or with the region of the two-dimensional code overlapping the ridge pattern region and the non-ridge pattern region, wherein
a valley depth of a valley portion between the adjacent ridges in the ridge pattern region in the portion in which the region of the two-dimensional code overlaps the ridge pattern region is less than the valley depth of the valley portion between the adjacent ridges in a portion of the ridge pattern region, the portion surrounding and adjoining the region of the two-dimensional code.

\* \* \* \* \*